United States Patent
Yi et al.

(10) Patent No.: US 9,796,487 B2
(45) Date of Patent: Oct. 24, 2017

(54) FUEL-FREE SPACECRAFT PROPELLING SYSTEM BASED ON SPATIAL ATOMIC OXYGEN AND PROPELLING METHOD

(71) Applicant: Beijing Institute of Spacecraft Environment Engineering, Beijing (CN)

(72) Inventors: Zhong Yi, Beijing (CN); Chao Zhang, Beijing (CN); Lifei Meng, Beijing (CN); Haifu Jiang, Beijing (CN); Yenan Liu, Beijing (CN); Qi Xiao, Beijing (CN); Lixiang Jiang, Beijing (CN); Zhaoji Yu, Beijing (CN)

(73) Assignee: Beijing Institute of Spacecraft Environment Engineering, Beijing (CN)

( * ) Notice: Subject to any disclaimer, the term of this patent is extended or adjusted under 35 U.S.C. 154(b) by 359 days.

(21) Appl. No.: 14/403,109

(22) PCT Filed: May 7, 2013

(86) PCT No.: PCT/CN2013/075242
§ 371 (c)(1),
(2) Date: Feb. 17, 2015

(87) PCT Pub. No.: WO2013/174208
PCT Pub. Date: Nov. 28, 2013

(65) Prior Publication Data
US 2015/0210406 A1     Jul. 30, 2015

(30) Foreign Application Priority Data

May 22, 2012  (CN) .......................... 2012 1 0159715
Aug. 1, 2012   (CN) .......................... 2012 1 0270034

(51) Int. Cl.
*B64G 1/40*     (2006.01)
*F03H 1/00*     (2006.01)

(52) U.S. Cl.
CPC ............. *B64G 1/405* (2013.01); *B64G 1/409* (2013.01); *F03H 1/0012* (2013.01);
(Continued)

(58) Field of Classification Search
CPC ........ F03H 1/00; F03H 1/0012; F03H 1/0037; F03H 1/0043; F03H 1/005; F03H 1/0056;
(Continued)

(56) References Cited

U.S. PATENT DOCUMENTS 6,449,941 B1    9/2002   Warboys et al.
7,247,992 B2    7/2007   Kornfeld et al.
(Continued)

FOREIGN PATENT DOCUMENTS

CN    1736131 A       2/2006
CN    101855948 A    10/2010
(Continued)

*Primary Examiner* — William H Rodriguez
*Assistant Examiner* — William Breazeal
(74) *Attorney, Agent, or Firm* — Walter | Haverfield LLP; D. Peter Hochberg; Sean F. Mellino

(57) ABSTRACT

A fuel-free spacecraft propelling system having an open-ended outer cylinder of a propelling device and an atomic oxygen collecting device is disclosed. The latter is arranged at the forwardly-propelled front end of the outer cylinder and is hermetically connected with an RF generating device and an ion cyclotron wave heating device through a magnetic confinement device. A spiral wave discharge oxygen plasma inlet and a spiral wave discharge oxygen plasma outlet in the ion cyclotron wave heating device are respectively provided with another magnetic confinement device. The propulsion of the invention does not need to carry the propellant, which greatly reduces the launch costs, and (Continued)

enables a spacecraft to advantageously have an increased orbit life over existing spacecraft systems.

5 Claims, 1 Drawing Sheet

(52) U.S. Cl.
CPC ......... *F03H 1/0037* (2013.01); *F03H 1/0081* (2013.01); *F03H 1/0093* (2013.01)

(58) Field of Classification Search
CPC .... F03H 1/0062; F03H 1/0068; F03H 1/0087; F03H 1/0081; F03H 1/0093
See application file for complete search history.

(56) References Cited

U.S. PATENT DOCUMENTS

| | | | |
|---|---|---|---|
| 7,581,380 B2 | 9/2009 | Wahl | |
| 7,581,390 B2 | 9/2009 | Wahl | |
| 8,587,202 B2 | 11/2013 | Harmann et al. | |
| 2005/0212442 A1 | 9/2005 | Kornfeld et al. | |
| 2007/0234705 A1* | 10/2007 | Emsellem ............ | F03H 1/0081 60/202 |
| 2008/0093506 A1* | 4/2008 | Emsellem ............. | H05H 1/54 244/169 |
| 2010/0213851 A1* | 8/2010 | Chang Diaz ......... | F03H 1/0093 315/111.41 |
| 2011/0089836 A1 | 4/2011 | Harmann et al. | |

FOREIGN PATENT DOCUMENTS

| | | |
|---|---|---|
| CN | 102767497 A | 11/2012 |
| CN | 102797656 A | 11/2012 |

\* cited by examiner

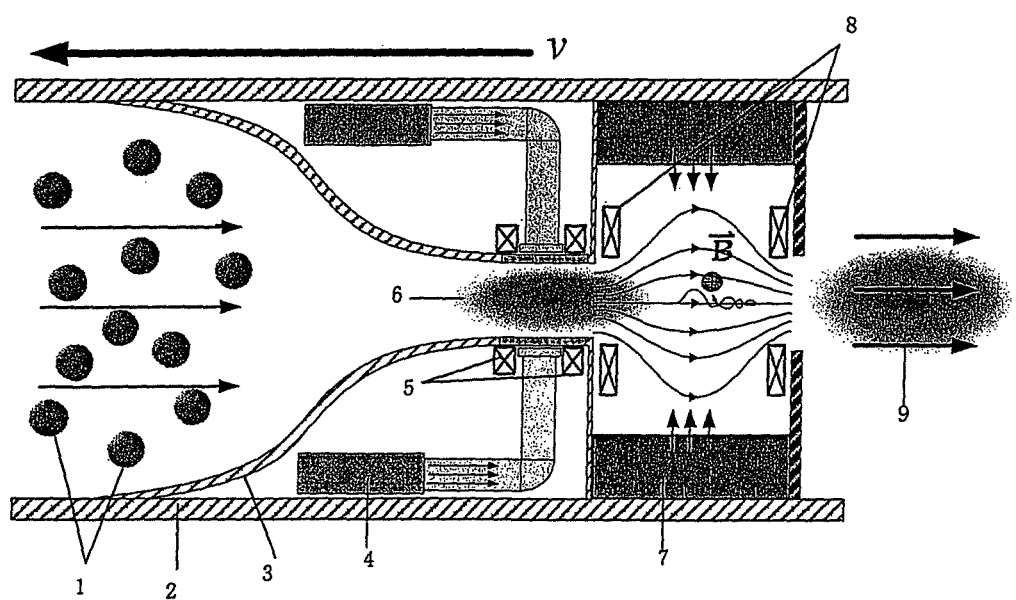

FUEL-FREE SPACECRAFT PROPELLING SYSTEM BASED ON SPATIAL ATOMIC OXYGEN AND PROPELLING METHOD

CROSS REFERENCE TO RELATED APPLICATIONS

The present invention is a U.S. national phase of PCT/CN2013/075242 filed May 7, 2013, and claims priority from Chinese patent application Serial No. 201210159715.2 filed May 22, 2012 and Chinese patent application Serial No. 201210270034.3 filed Aug. 1, 2012, the subject matter of which are incorporated herein by reference.

TECHNICAL FIELD

The invention relates to the technical field of spacecraft propulsion, and more particularly relates to a fuel-free orbit spacecraft propulsion system based on space atomic oxygen and a method for propelling an orbit spacecraft continuous movement based on the system.

BACKGROUND OF THE INVENTION

Space propulsion techniques can be divided into a chemical propulsion and an electric propulsion, as well as some other propulsion techniques (such as solar sail, tethered propulsion and the like). At present, most main thrusters of spacecraft employ chemical propulsion. But as an advanced propulsion technique, electric propulsion is getting more and more attention.

Chemical propulsion is a kind of propulsion technique using chemical energy to send the spacecraft into the reserved space orbit and realizes orbit maneuver. The most prominent feature of chemical propulsion is high propulsion, which is the most used technique in the space field. A chemical engine is used in the present long-life tri-axial attitude control stabilized satellite and spin satellite as a controlling and executing assembly. There are two work modes of the chemical engine: pulsating work and stability work. The pulsating work is mostly used in satellite attitude-adjusting and position-retaining; while the stability work is mostly used in satellite-orbit maneuver.

An electric propulsion system provides energy to a propellant using electricity generated by a solar panel or a nuclear reactor, to make the propellant produce a jet velocity far more than a common chemical thruster. High specific impulse of electric propulsion can reduce the system quality, save the propellant, improve the lifetime and increase payload. Besides applying in a long-life communication satellite to improve the performance of the satellite platform, the electric propulsion can complete the tasks which a common propulsion system is unable to do.

Both chemical propulsion and electric propulsion need to carry certain propellants, which not only occupy the weight of a spacecraft platform but also greatly increase the launch costs. Meanwhile in-orbit maneuver life of a spacecraft mainly depends on the quantity of carried fuel. A propulsion mode depends on the carried fuels and seriously restricts the spacecraft platform function extension and service life prolongation. So, the present international space field is actively developing all kinds of propulsion techniques based on the use of space environment. All the new techniques, including solar sail, magnetic sail, magnetic engine or the like, are developed based on the use of space environment using light, electric, magnetic and the like.

SUMMARY OF THE INVENTION

The invention solves the problem that the propulsion method of the present spacecraft carrying fuels has high-cost launch. The spacecraft orbit life depends on an amount of carried fuels resulting in the restriction of spacecraft orbit life. The invention uses space atomic oxygen as a propellant, thereby making in-orbit maneuver of the spacecraft in space environment a continuous space rotation movement without any influence by tiny resistance in space environment.

To solve the aforementioned problem, the invention adopts the following technical scheme.

A fuel-free spacecraft propulsion system based on space atomic oxygen, comprises an outer cylinder of a propulsion device, the outer cylinger having a first open end and a second open end, in which an atomic oxygen collecting device, an RF generating device and an ion cyclotron wave heating device are arranged orderly. The atomic oxygen collecting device is arranged at the first open end of the outer cylinder of the propulsion device for propelling forwardly, and is hermetically connected with one end of the RF generating device through a first magnetic confinement device while the other end of the RF generating device is connected with the ion cyclotron wave heating device through a second magnetic confinement device. The inlet and outlet of a spiral wave discharge oxygen plasma in the ion cyclotron wave heating device are respectively provided with a third and fourth magnetic confinement device. The atomic oxygen collecting device is used for pressurizing space atomic oxygen flowing into the first end of the outer cylinder of the propulsion device for propelling forwards. The pressurized space atomic oxygen is ionized in a spiral wave discharge mode in the RF generation device. The oxygen ions of the ionized oxygen plasma in the ion cyclotron wave heating device absorbs the energy of the cyclotron wave and lead to an increase in kinetic energy. Magnetic field configuration (shape and distribution of magnetic flux) of a sprayer is changed by adjusting the third and fourth magnetic confinement device inside the ion cyclotron wave heating device so that circumferential motion of the oxygen ions is transformed into parallel motion, and a propulsion three is provided for the spacecraft after the oxygen ions are sprayed out of the sprayer.

Further, the aforementioned atomic oxygen collecting device has a gradually diminished sectional area, preferably a trumpet-type atomic oxygen collecting device.

Further, the spiral wave discharge mode of the RF generating device is produced by the RF discharging, and the ion cyclotron wave of the ion cyclotron wave heating device is produced by the RF device.

Further, the magnetic field is changed into a divergent magnetic field.

In a use of the propulsion system, the propulsion system is arranged at both sides of a spacecraft. The atomic oxygen in orbit space environment is used as a propellant, ionized in spiral wave mode, heated by ion cyclotron, and then sprayed out at a high speed so as to propel in-orbit maneuver of the spacecraft.

In comparison with traditional electric propulsion techniques, the propulsion of the invention does not need to carry the propellant, which greatly reduces the launch costs, enables a spacecraft to work in an orbit in the whole life circle work and is greatly advantageous.

BRIEF DESCRIPTION OF DRAWINGS

FIG. 1 illustrates a schematic view of the fuel-free spacecraft propulsion system based on space atomic oxygen.

DESCRIPTION OF THE PREFERRED EMBODIMENTS OF THE INVENTION

In FIG. 1, the following numbers indicate the respective components: 1—space atomic oxygen; 2—an outer cylinder of the propulsion device; 3—an atomic oxygen collecting device; 4—an RF generating device; 5—a magnetic confinement device; 6—a spiral wave discharge oxygen plasma; 7—an ion cyclotron wave heating device; 8—a magnetic confinement device; 9—an ion spraying flame.

Embodiments of the present fuel-free spacecraft propulsion system based on space atomic oxygen of the invention now will be described more fully with reference to the accompanying drawings. These embodiments are provided for example, and the invention should not be construed as limited to the embodiments.

In FIG. 1, a fuel-free spacecraft propulsion system based on space atomic oxygen of the invention, comprises an outer cylinder 2 of a propulsion device with both ends open, an atomic oxygen collecting device 3, an RF generating device 4 and an ion cyclotron wave heating device 7 inside the outer cylinder of the propulsion device 2. The atomic oxygen collecting device 3 is arranged at the front end of the outer cylinder 2 of propulsion device propelling forwardly following an orbit spacecraft. Space atomic oxygen 1 enters the atomic oxygen collecting device 3 with the orbit spacecraft being propelled forward. The atomic oxygen collecting device 3 is hermetically connected with one end of the RF generating device 4 through a first magnetic confinement device 8 arranged at both ends of the RF generating device 4. The other end of the RF generating device 4 is hermetically connected with the ion cyclotron wave heating device 7 through a second magnetic confinement device arranged at the end. From the entering end of the space atomic oxygen 1 to the entering end through which the space atomic oxygen enter the RF generating device 4, the atomic oxygen collecting device 3 has a gradually diminished sectional area, such as trumpet-type atomic oxygen collecting device. The atomic oxygen collecting device 3 is used for pressurizing the space atomic oxygen entering the first end of the outer cylinder of the propulsion device while the spacecraft is moving forward. The pressurized space atomic oxygen is ionized in a spiral wave discharge mode in the RF generating device 4. A spiral wave discharge oxygen plasma 6 from the RF generating device 4 enters the ion cyclotron wave heating device 7. An inlet and an outlet of the spiral wave discharge oxygen plasma 6 in the heating device are respectively provided with a third and fourth magnetic confinement device 8. The oxygen ions of the ionized oxygen plasma in the ion cyclotron wave heating device absorb the energy of the cyclotron wave and result in the kinetic energy increase. The magnetic field configuration of a sprayer is changed by adjusting the magnetic confinement device inside the ion cyclotron wave heating device 8. The magnetic field configuration means the shape and distribution of the magnetic flux. Circumferential motion of the oxygen ions is transformed into parallel motion, and a propulsion force is provided for the spacecraft after the oxygen ions are sprayed out of the sprayer. The spraying plasma is the ion spraying flame. The magnetic field is changed to a divergent magnetic field. The divergent magnetic field is that the magnetic lines of it extend radially from an interior of the ion cyclotron wave heating device to the oxygen ions sprayer.

A fuel-free spacecraft propulsion system based on space atomic oxygen of the invention specially applies to propel in-orbit maneuver of a spacecraft in space environment. When using the propulsion system, the propulsion system is arranged at both sides of the spacecraft. The atomic oxygen in orbit space environment is used as a propellant, ionized in a spiral wave mode, heated by an ion cyclotron, then sprayed after acceleration to propel in-orbit maneuver of the spacecraft.

To simply explain the process of the present fuel-free spacecraft propulsion system, the system is a cylindrical space particles collecting device, arranged at a special position of the spacecraft, to collect atomic oxygen of orbit space environment as the spacecraft is moving. The 300 km orbit space environment exists about the atomic oxygen. AO density of $10^{15}/m^3$, of which average thermal motion speed can be ignored compared with speed of the spacecraft, so atomic oxygen AO in orbit can be regarded as static. The relative speed of both is the speed of the spacecraft, about 8 km/s (a first cosmic speed).

Atomic oxygen AO is discharged as ion oxygen. If its kinetic energy is increased to 1 KeV by the RF heating mode, $Ft=\Delta(mv)$, $$v = \sqrt{\frac{2E}{m}},$$

we can see that:

$Ft=\sqrt{2mE}$

An $O^+$ can gain the impulse of about $0.3\times10^{-20}$(N.S).

Supposing that the spacecraft carries an AO collecting device with 1 m² sectional area, the collecting atomic oxygen amount per unit time is:

$N=nV=nSvt$

Wherein, in is orbit AO atomic oxygen density ($10^{15}/m^3$), S is a collecting sectional area (1 m²), and v is a spacecraft motion speed (about 8 km/s), the collecting atomic oxygen AO amount per unit time is $8\times10^{18}$.

From $Ft=\Delta$ (MV)=$\Delta$ (nmv), we can see that, when the particle's accelerating energy is constant, a propulsion force gained by using space and atomic oxygen is proportional to its ionization rate. Currently, an American organization that adopts the spiral wave discharge mode, under certain conditions, can gain the 100% discharged plasma. As a reference, all the collected atomic oxygen AO is ionized, the oxygen ions are accelerated to 1 KeV, the entire gained impulse Ft is $2.4\times10^{-2}$(N·S), and the gained propulsion force is 24 mN.

The fuel-free spacecraft propulsion is based on the space atomic oxygen. The gained propulsion force is proportional to the collecting atomic oxygen flux density per unit time, the ionization rate and the ion heating energy. If the radii of the collecting device is 1 m, the atomic oxygen is 100% ionized per unit time, and the oxygen ions are heated to 1 KeV and the gained propulsion force is 70 mN. Even when the ionization rate is 50%, the gained propulsion force is 35 mN.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A spacecraft propulsion system comprising:
   an outer cylinder that surrounds and arranges in series, in a downstream direction, along a flow path for atomic oxygen through the spacecraft propulsion system:
   an atomic oxygen collecting device;
   an upstream magnet of a first magnetic confinement device;
   an RF generating device;
   a downstream magnet of a first magnetic confinement device; and
   an ion cyclotron wave heating device having an upstream magnet of a second magnetic confinement device at an upstream end of the ion cyclotron wave heating device and having a downstream magnet of the second magnetic confinement device at a downstream end of the ion cyclotron wave heating device, the second magnetic confinement device generating magnetic field lines that diverge and then converge in a radial direction from upstream to downstream within the ion cyclotron wave heating device;
   wherein the outer cylinder has an outer cylinder upstream end upstream of the atomic oxygen collecting device and an outer cylinder downstream end downstream of the downstream magnet of the second magnetic confinement device
   wherein the outer cylinder upstream end provides atomic oxygen to the atomic oxygen collecting device, wherein the atomic oxygen collecting device increases a pressure of the atomic oxygen thereby providing pressurized atomic oxygen through the upstream magnet of the first magnetic confinement device to the RF generating device that generates RF radiation to ionize the pressurized atomic oxygen thereby providing an oxygen plasma through the downstream magnet of the first magnetic confinement device to the upstream magnet of the second magnetic confinement device of the ion cyclotron wave heating device, wherein oxygen ions of the oxygen plasma are heated by ion cyclotron wave radiation generated by the ion cyclotron wave heating device thereby providing a heated oxygen plasma that passes through the downstream magnet of the second magnetic confinement device thereby generating propulsive force for the spacecraft,
   wherein the spacecraft propulsion system generates said propulsive force without propellant from spacecraft onboard propellant storage.

2. The spacecraft propulsion system according to claim 1, wherein a cross section of the atomic oxygen collecting device is reduced in the downstream direction.

3. The spacecraft propulsion system according to claim 1, wherein a cross section of the atomic oxygen collecting device reduces continuously in the downstream direction.

4. The spacecraft propulsion system according to claim 1, wherein the RF generating device operates in a spiral wave discharge mode, and wherein the RF generation device generates the ion cyclotron wave radiation.

5. A method of operating a spacecraft having a spacecraft propulsion system according to claim 1 comprising the steps of:
   providing the spacecraft propulsion system on the spacecraft;
   taking in atomic oxygen from a space environment;
   ionizing the atomic oxygen in the RF generator operating in a spiral wave mode thereby generating ionized oxygen;
   heating the ionized oxygen via ion cyclotron wave radiation thereby generating heated oxygen plasma; and
   generating thrust for the spacecraft by discharging heated oxygen plasma.

* * * * *